United States Patent
Li et al.

(10) Patent No.: US 12,412,337 B1
(45) Date of Patent: Sep. 9, 2025

(54) METHOD FOR MULTI-SCALE DIGITAL ELEVATION MODEL GENERATION BASED ON CURVATURE WAVELET TRANSFORM

(71) Applicant: Lanzhou Jiaotong University, Lanzhou (CN)

(72) Inventors: Jingzhong Li, Lanzhou (CN); Ben Ma, Lanzhou (CN); Haowen Yan, Lanzhou (CN); Min Deng, Lanzhou (CN); Shihong Du, Lanzhou (CN); Liang Wu, Lanzhou (CN); Min Yang, Lanzhou (CN)

(73) Assignee: Lanzhou Jiaotong University, Lanzhou (CN)

( * ) Notice: Subject to any disclaimer, the term of this patent is extended or adjusted under 35 U.S.C. 154(b) by 0 days.

(21) Appl. No.: 19/206,416

(22) Filed: May 13, 2025

(30) Foreign Application Priority Data

Jun. 13, 2024 (CN) .......................... 202410757944.7

(51) Int. Cl.
*G06T 17/05* (2011.01)

(52) U.S. Cl.
CPC .................................. *G06T 17/05* (2013.01)

(58) Field of Classification Search
CPC ........................................................ G06T 17/05
See application file for complete search history.

(56) References Cited

U.S. PATENT DOCUMENTS

2010/0013829 A1 * 1/2010 Baxes .................... G06T 17/20
345/419

FOREIGN PATENT DOCUMENTS

| CN | 103236086 A |   | 8/2013 |
|---|---|---|---|
| CN | 115830260 A | * | 3/2023 |
| CN | 117671167 A |   | 3/2024 |
| WO | 2013121340 A1 |   | 8/2013 |

OTHER PUBLICATIONS

Kalbermatten, Michael, et al. "Multiscale analysis of geomorphological and geological features in high resolution digital elevation models using the wavelet transform." Geomorphology 138.1 (2012): 352-363. (Year: 2012).*

(Continued)

*Primary Examiner* — Ryan McCulley
(74) *Attorney, Agent, or Firm* — Pilloff Passino & Cosenza LLP; Rachel K. Pilloff; Sean A. Passino

(57) ABSTRACT

A multi-scale DEM generation method based on curvature wavelet transform is provided. The method includes following steps: obtaining a wavelet basis function and a wavelet decomposition layer number of the curvature wavelet transform, and a DEM related parameter feature information amount and an output resolution; an grid surface curvature of DEM data is acquired, and the grid surface curvature of the DEM data is decomposed and reconstructed based on the wavelet basis function and the wavelet decomposition layer number to obtain a reconstruction matrix; based on the reconstruction matrix, terrain feature points in the DEM data are extracted by taking a feature information amount as a threshold; and based on the terrain feature points in the DEM data, resampling is performed with the output resolution as resolution, so that DEM generation and synthesis are realized.

5 Claims, 10 Drawing Sheets

(56) References Cited

OTHER PUBLICATIONS

Notice of first Office action dated Jan. 9, 2025 in SIPO application No. 202410465853.6.
Retrieval report—First search dated Jan. 8, 2025 in SIPO application No. 202410465853.6.
Notification to Grant Patent Right for Invention dated Feb. 18, 2025 in SIPO application No. 202410465853.6.
Retrieval report—Supplementary search dated Feb. 8, 2025 in SIPO application No. 202410465853.6.

* cited by examiner

METHOD FOR MULTI-SCALE DIGITAL ELEVATION MODEL GENERATION BASED ON CURVATURE WAVELET TRANSFORM

CROSS-REFERENCE TO RELATED APPLICATIONS

This application claims priority to Chinese Patent Application No. 202410757944.7, filed on Jun. 13, 2024, the contents of which are hereby incorporated by reference.

TECHNICAL FIELD

The present disclosure belongs to the technical field of information science, in particular to a method for multi-scale digital elevation model (DEM) generation based on curvature wavelet transform.

BACKGROUND

The DEM realizes digital simulation of actual terrain through a set of ordered numerical arrays. DEM is one of important data sources for a construction of national spatial database, and DEM is a basic topographic data for a three-dimensional (3D) real scene construction of multi-scale China, which has the characteristics of multi-scale and multi-level. In engineering construction, road planning, military operations and other fields, multi-scale and multi-resolution DEM data plays an important role. One of mainstream ways to construct multi-scale and multi-resolution DEM is to use DEM synthesis method, the simplicity and high efficiency of DEM synthesis are helpful to an efficient construction of national spatial database and promote a development of China 3D real scene, which has important theoretical and practical significance.

At present, DEM synthesis methods are mainly divided into three categories: a method based on spatial/frequency filtering, a method based on structure selection, and a method based on an importance evaluation of DEM data points. Among them, the method based on spatial/frequency filtering mainly decomposes an information in DEM into high information load part and low information load part by filtering, and DEM synthesis able to be realized by weakening and eliminating a low information load part; in the method based on structure selection, terrain features are extracted by identifying hidden information, and then an importance of different terrain features is evaluated by combining an overall geographic information, and finally the terrain features with lower importance are weakened or eliminated to realize an integration of DEM; in the method based on the importance evaluation of DEM data points, by setting certain rules for different types and regions of data, an importance of data points in DEM is evaluated, and then a low-resolution DEM is reconstructed by selecting DEM data points with higher importance, these data points generally represent the location of key terrain, so as to reconstruct the low-resolution DEM and achieve a purpose of DEM synthesis.

The method based on spatial/frequency filtering lacks a control of structural information, and its comprehensive results will lose main terrain features to some extent; the method based on structure selection needs complex terrain structure information extraction technology, and parameters are subjective, so it is difficult to achieve practical purposes; the method based on the importance evaluation of DEM data points needs to extract important DEM data points first, but there is a lack of concrete algorithms to extract a terrain represented as point elements in DEM. Therefore, it is urgent to propose a method for multi-scale DEM generation based on curvature wavelet transform, which is suitable for a synthesis of large-scale DEM data.

SUMMARY

In order to solve the above technical problems, the present disclosure provides a method for multi-scale DEM generation based on curvature wavelet transform to solve the problems existing in the prior art.

In order to achieve the above objectives, the disclosure provides a method for multi-scale DEM generation based on curvature wavelet transform, including the following steps:

obtaining a wavelet basis function and a wavelet decomposition layer of curvature wavelet transform, as well as a characteristic information and output resolution of DEM related parameters;

acquiring a grid surface curvature of DEM data, and decomposing and reconstructing the grid surface curvature of DEM data based on the wavelet basis function and wavelet decomposition layers to obtain a reconstruction matrix;

based on the reconstruction matrix, terrain feature points in DEM data are extracted with a feature information amount as a threshold; and based on the terrain feature points in DEM data, resampling is carried out with an output resolution as a resolution to realize DEM generation and synthesis.

Optionally, a process of obtaining the grid surface curvature of DEM data includes: obtaining an original DEM data, fitting an elevation value of each pixel in the original DEM data and its eight neighboring pixels, and obtaining the grid surface curvature of DEM data.

Optionally, a process of decomposing the grid surface curvature of DEM data includes: performing wavelet transform on the grid surface curvature of DEM data based on the wavelet basis function and wavelet decomposition layers to obtain a low-frequency approximation matrix and three high-frequency detail matrices, where the high-frequency detail matrices include a horizontal detail matrix, a vertical detail matrix and a diagonal detail matrix.

Optionally, a process of reconstructing the grid surface curvature of DEM data includes: constructing three zero matrices with the same size as a high-frequency detail matrix and performing wavelet reconstruction with the low-frequency approximation matrix and the three zero matrices to obtain the reconstruction matrix.

Optionally, a process of extracting terrain feature points from DEM data includes: obtaining positive value sequences and negative value sequences based on the reconstruction matrix; multiplying the feature information by the positive value sequences and negative value sequences respectively to obtain a corresponding positive value sequence feature quantity and negative value sequence feature quantity; taking a feature number of positive value sequences and negative value sequences as thresholds, elements in positive value sequences and negative value sequences are extracted as feature point sets; traversing all feature point sets, mapping a row and column number of each feature point in the reconstruction matrix to the row and column number of DEM data, and marking the terrain feature points, after traversing, all terrain feature points in DEM data are obtained.

Optionally, an acquisition process of the positive value sequences is as follows: arranging positive values in the reconstruction matrix from large to small to obtain the positive value sequences; and an acquisition process of negative value sequences is: arranging negative values in the reconstruction matrix from small to large to obtain negative value sequences.

Optionally, a process of DEM generation and synthesis includes cubic interpolating the terrain feature points in DEM data, and resampling at the same time with the output resolution as the resolution to obtain a new resolution of DEM data to realize DEM generation and synthesis.

Compared with the prior art, the disclosure has the following advantages and technical effects.

The disclosure realizes an expression of terrain features in DEM data based on the grid surface curvature, and may express features of DEM data quickly and efficiently by analyzing a curvature of DEM data, which shows a changing trend of a terrain in horizontal and vertical directions. By using this feature as a basis for selecting the feature points of DEM data, the terrain may be effectively recognized and a multi-scale comprehensive effect of DEM may be improved.

According to the disclosure, a multi-scale expression of terrain in DEM is realized based on curvature wavelet transform, and a number of wavelet decomposition layers is used as different expression scales, so the multi-scale expression of terrain characteristics of DEM may be realized from multiple perspectives, and the multi-scale expression of terrain characteristics of DEM may be efficiently realized, and a high-quality data foundation is also provided for a multi-scale DEM generation.

According to the disclosure, terrain feature points are selected by taking the feature information amount as a threshold, and DEM is generated by combining curvature wavelet transform results at different scales with cubic interpolation method, so the multi-scale DEM generation may be realized on a basis of considering the feature information amount, and a generation effect is more in line with a spatial distribution characteristics of DEM data and human spatial cognition.

BRIEF DESCRIPTION OF THE DRAWINGS

The attached drawings, which constitute a part of this disclosure, are used to provide a further understanding of this disclosure. The illustrative embodiments and descriptions of this disclosure are used to explain this disclosure, and do not constitute an improper limitation of this disclosure. In the attached drawings.

DETAILED DESCRIPTION OF THE EMBODIMENTS

Figure 1:
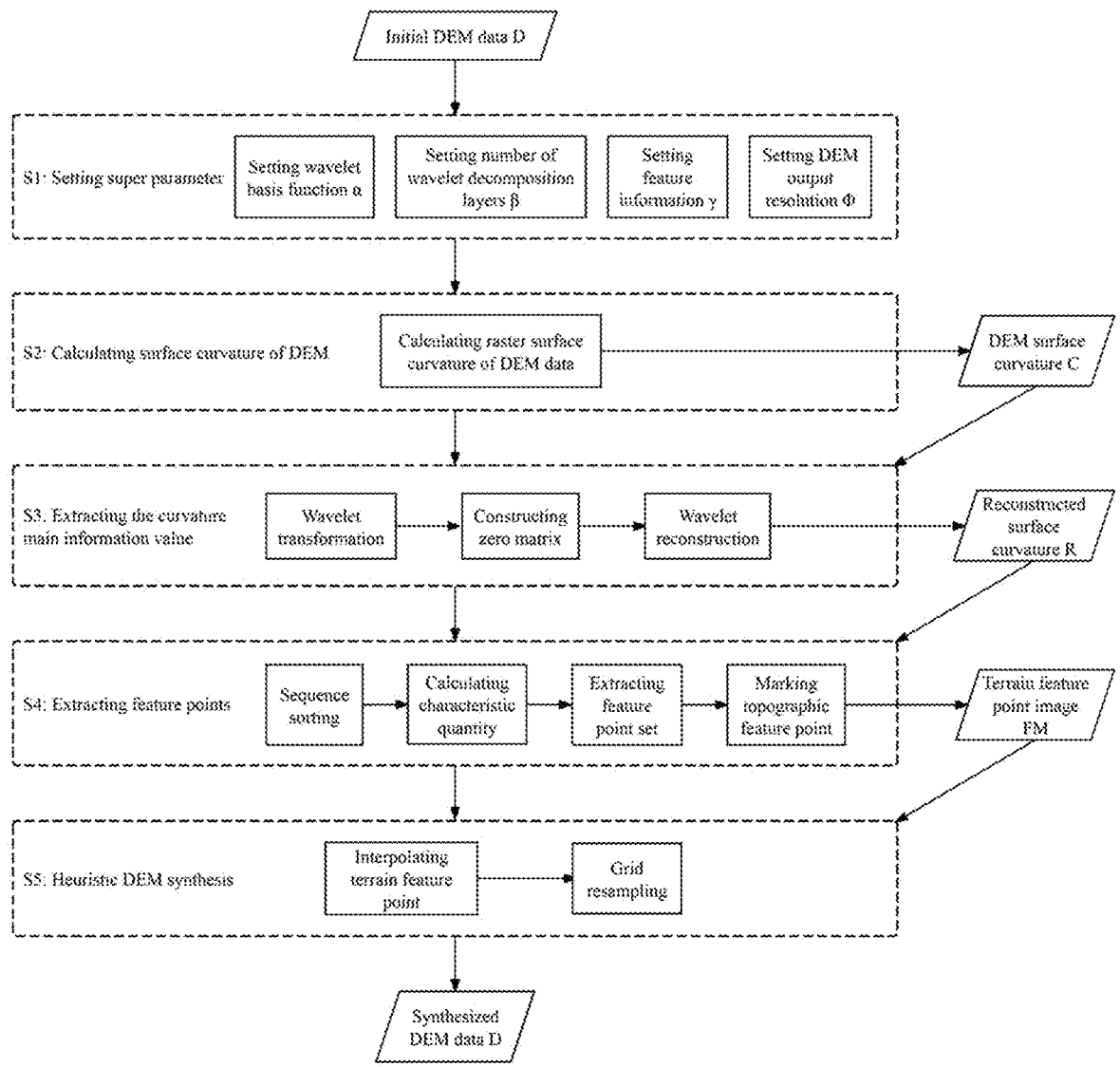
FIG. 1 is a schematic flow diagram of a method according to an embodiment of the present disclosure.

It should be noted that the embodiments in this disclosure and the features in the embodiments may be combined with each other without conflict. The present disclosure will be described in detail with reference to the attached drawings and embodiments.

It should be noted that the steps shown in the flowchart of the attached drawings may be executed in a computer system such as a set of computer-executable instructions, and although the logical order is shown in the flowchart, in some cases, the steps shown or described may be executed in a different order from here.

Embodiment 1

In this embodiment, a method for DEM model generation based on curvature wavelet transform is provided, this method uses grid curvature analysis and image wavelet transform to describe terrain features hidden in DEM data and extract terrain feature points under multi-scale, and then interpolates DEM data with feature points as constraints, this method is essentially a multi-scale DEM synthesis method. Firstly, hyperparameters of curvature wavelet transform and DEM synthesis need to be set to calculate a grid surface curvature of DEM data; then, a main curvature information hidden in a surface curvature is extracted based on wavelet transform and reconstruction, and the terrain feature points in DEM data are extracted based on a feature information threshold; finally, cubic interpolation and resampling are used for heuristic DEM synthesis. This method may effectively improve an efficiency of DEM generation and synthesize multi-scale data.

In order to achieve the above objectives, this embodiment provides a method for multi-scale DEM generation based on curvature wavelet transform, including the following steps:

S1: setting the hyperparameters of curvature wavelet transform and DEM synthesis, including the wavelet base function $\alpha$ of curvature wavelet transform, a number of wavelet decomposition layers $\beta$, a characteristic information $\gamma$ of DEM related parameters and an output resolution $\varphi$; among them, the dimensionless percentage to measure the feature information is between 0-100%.

S2: calculating the grid surface curvature of DEM data; and based on an original DEM data, the grid surface curvature of DEM data is obtained by fitting an elevation value of each pixel in the original DEM data and its eight adjacent pixels.

S3: extracting an main information value of the surface curvature of the DEM data grid, and decomposing and reconstructing the surface curvature of the DEM based on a given wavelet basis function $\alpha$ and wavelet decomposition layer $\beta$.

In the S3: for the surface curvature c of DEM data, the main information value in the surface curvature of DEM data is extracted based on the curvature wavelet transform method, and specific steps are as follows.

Step 3.1: taking the wavelet basis function α and the number of wavelet decomposition layers β in the S1, and carrying out wavelet transform on C, the transformation result is a low-frequency approximation matrix CA and three high-frequency detail matrices, including a horizontal detail matrix CHD, a vertical detail matrix CVD and a diagonal detail matrix CDD.

Step 3.2: constructing three zero matrices ZM1, ZM2 and ZM3, where the size of the zero matrix is the same as the size of three high-frequency detail matrices, namely, a horizontal detail matrix CHD, a vertical detail matrix CVD and a diagonal detail matrix CDD.

Step 3.3: the low-frequency approximation matrix CA in the Step 3.1 and the three zero matrices ZM1, ZM2 and ZM3 in the Step 3.2 are used for wavelet reconstruction to obtain a reconstruction matrix R, so as to compress a secondary information in the surface curvature C of DEM data and highlight an main information.

S4: extracting terrain feature points in DEM data based on the feature information gamma as a threshold.

In the S4, for the reconstruction matrix R of DEM data reconstructed by wavelet transform, the terrain feature points in DEM data are extracted based on the feature information γ as the threshold, and specific steps are as follows.

Step 4.1: the DEM data is statistically analyzed by reconstructing the matrix R through wavelet transform, and positive values in R are arranged from the largest to the smallest, and recorded as a positive value sequence PS, and the negative values are arranged from the smallest to the largest, and recorded as a negative value sequence NS.

Step 4.2: multiplying the feature information γ by a number of elements in the positive value sequence PS and the negative value sequence NS to obtain a feature number γ PS of the positive value sequence and a feature number γ NS of the negative value sequence.

Step 4.3: respectively taking positive value sequence feature quantity γ PS and negative value sequence feature quantity γ NS as thresholds, extracting first γ PS elements in the positive value sequence PS and first γ NS elements in the negative value sequence NS as feature point sets FS.

Step 4.4: traversing the feature point sets FS, mapping row and column numbers in the wavelet transform reconstruction matrix R to the row and column numbers of DEM data, and marking this position as a terrain feature point as 1 at the same time, after traversing the feature point sets FS, marking unlabeled pixels in DEM data as 0 to form a terrain feature point binary image FM.

S5: based on an extracted DEM terrain feature points, heuristic DEM synthesis is carried out by cubic interpolation method.

In the S5, the terrain feature points in DEM data are cubic interpolated and resampled at the same time with the output resolution p as the resolution, and a new resolution of DEM data is obtained, denoted as D φ, to realize DEM synthesis.

Embodiment 2

Figure 2:
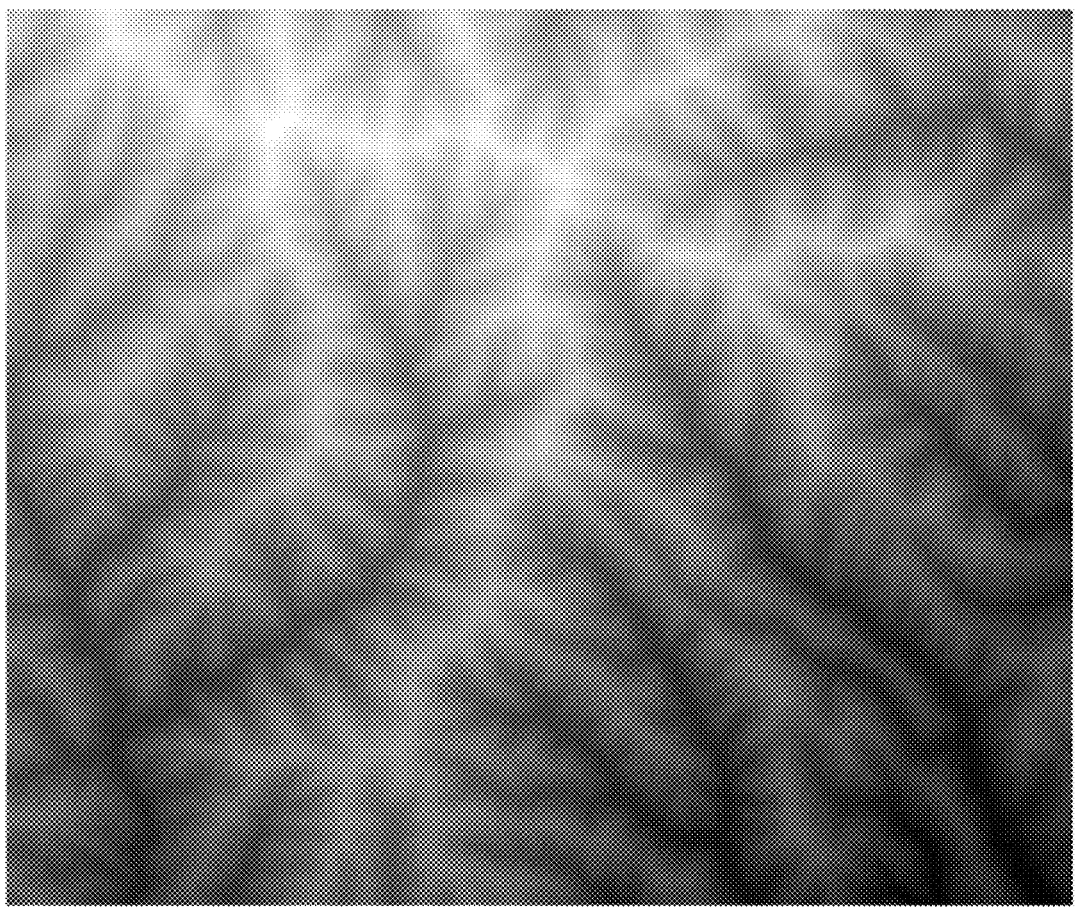
FIG. 2 is a schematic diagram of an original DEM data with a resolution of 25 m according to an embodiment of the present disclosure.

In this embodiment, the resolution of an original DEM is 25 m, as shown in FIG. 2; the resolution of a target DEM is 50 m, and basic tools needed in this embodiment are corresponding tools in ArcGIS Geoprocessing Toolbox of GIS software and a corresponding third-party toolkit in Python.

Referring to FIG. 1, this embodiment provides a method for multi-scale DEM generation based on curvature wavelet transform, specifically including the following steps.

S1: setting hyperparameters of curvature wavelet transform and DEM synthesis, including a wavelet base function α="bior3.7" of curvature wavelet transform, a number of wavelet decomposition layers β=1, a feature information γ=30% and a DEM output resolution φ=50 m; among them, a dimensionless percentage to measure the feature information is between 0-100%.

S2: calculating the grid surface curvature of DEM data.

S3: extracting the main information value of the grid surface curvature of the DEM data, and decomposing and reconstructing the surface curvature of the DEM based on a given wavelet basis function α and wavelet decomposition layer β.

S4: extracting terrain feature points in DEM data based on the feature information gamma as a threshold.

S5: based on the extracted DEM terrain feature points, heuristic DEM synthesis is carried out by cubic interpolation method.

Figure 3:
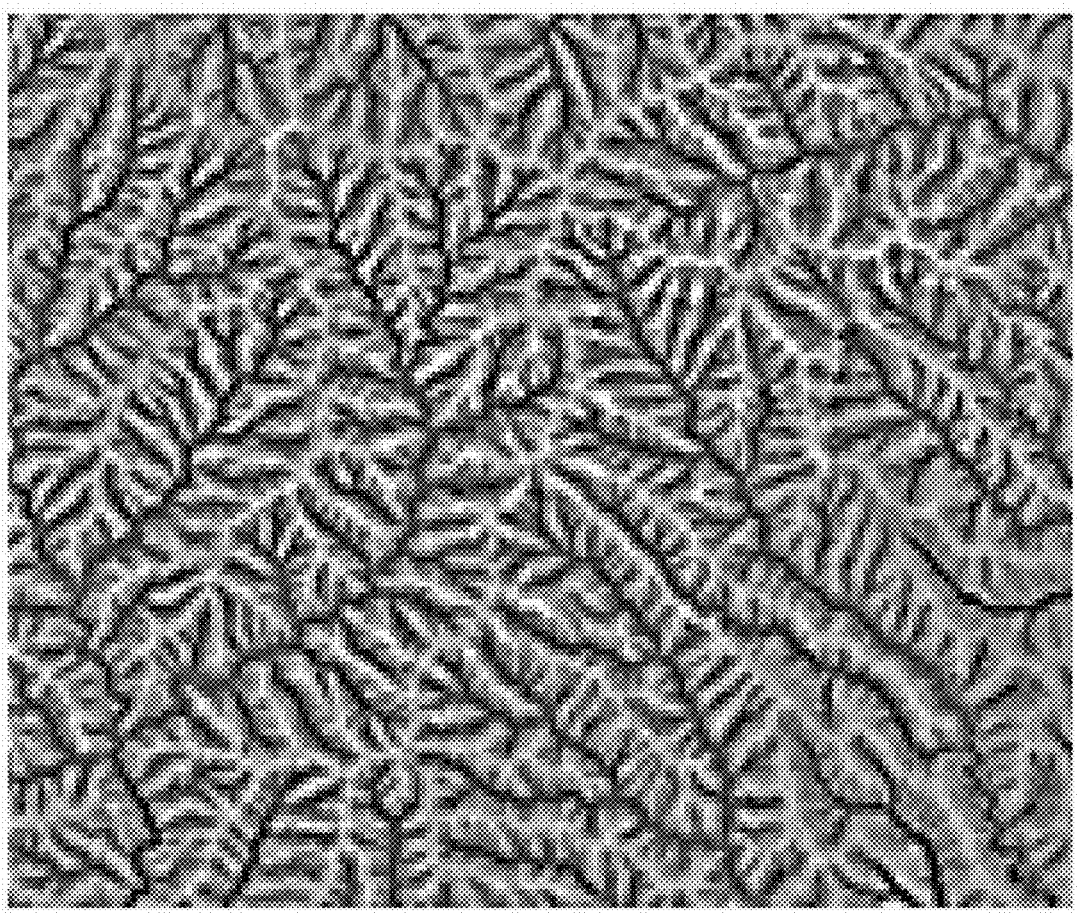
FIG. 3 is a calculated grid surface curvature effect diagram according to an embodiment of the present disclosure.
Figure 4A:
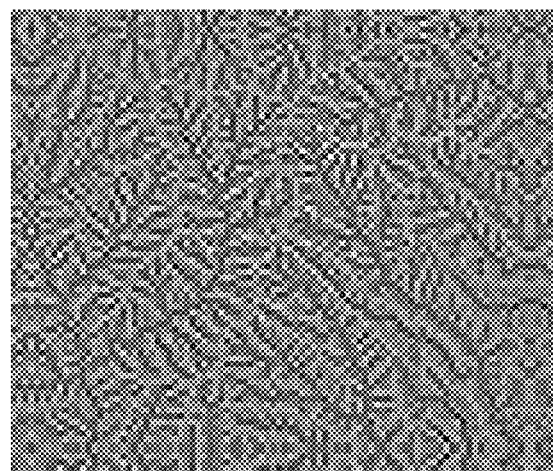
FIG. 4A is a schematic diagram of a result of a low-frequency approximation matrix when a parameter of an embodiment of the present disclosure is "bior3.7", 1.
Figure 4B:
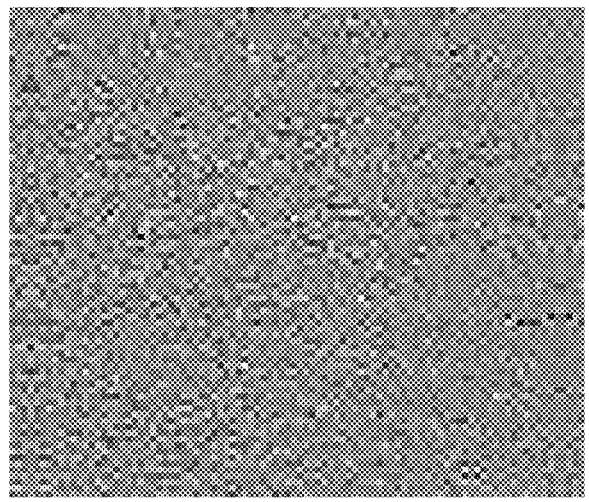
FIG. 4B is a schematic diagram of a result of a horizontal detail matrix when a parameter of an embodiment of the present disclosure is "bior3.7", 1.
Figure 4C:
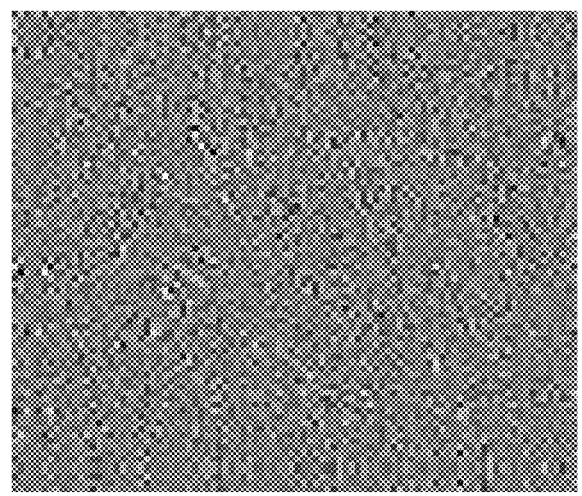
FIG. 4C is a schematic diagram of a result of a vertical detail matrix when a parameter of an embodiment of the present disclosure is "bior3.7", 1.
Figure 4D:
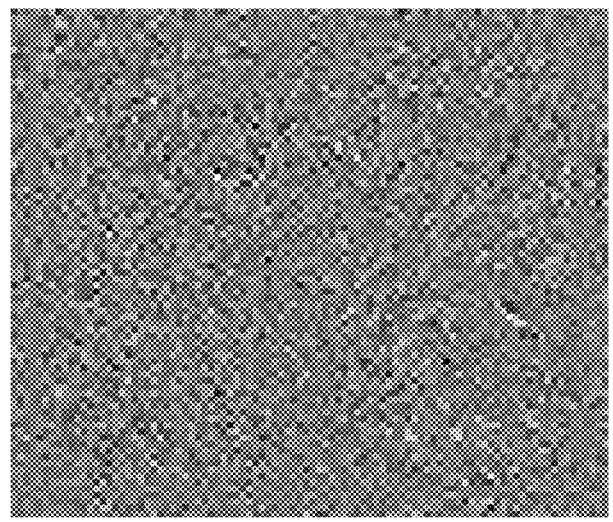
FIG. 4D is a schematic diagram of a result of a diagonal detail matrix when a parameter of an embodiment of the present disclosure is "bior3.7", 1.

In this embodiment, the S1 and the S2 firstly set the hyperparameters of curvature wavelet transform and DEM synthesis, including the wavelet basis function α="bior3.7", the number of wavelet decomposition layers β=1 and the feature information γ=30%; then the grid surface curvature of DEM data is calculated, and based on the original DEM data, the surface curvature of DEM data is obtained by fitting the elevation value of each pixel in DEM data and its adjacent eight pixels; the curvature of grid surface is calculated by the tool ArcToolbox\Spatial Analysis\Surface Analysis\Curvature in ArcGIS, a GIS software. FIG. 3 is the calculated grid surface curvature effect diagram.

In this embodiment, the S3 extracts the main information value of the surface curvature c of DEM data based on the curvature wavelet transform method, and the specific steps are as follows.

Step 3.1: taking the wavelet basis function α="bior3.7" and the number of wavelet decomposition layers β=1 in the S1, and carrying out wavelet transform on C, the transformation result is a low-frequency approximation matrix and three high-frequency detail matrices, including a horizontal detail matrix, a vertical detail matrix and a diagonal detail matrix, which are denoted as CA, CHD, CVD and CDD; and wavelet transform adopts the function in a third-party toolkit of "pywt.wavedecn ( )" in the programming language Python to calculate according to two input parameters. FIG. 4A, FIG. 4B, FIG. 4C, and FIG. 4D show the result of curvature wavelet transform calculated by the parameter ("bior3.7", 1).

Step 3.2: constructing three zero matrices ZM1, ZM2 and ZM3, where the size of the zero matrices is the same as the size of the three high-frequency detail matrices; the zero matrix is constructed by a function in the third-party toolkit of "numpy.zeros_like ( )" in Python.

Figure 5:
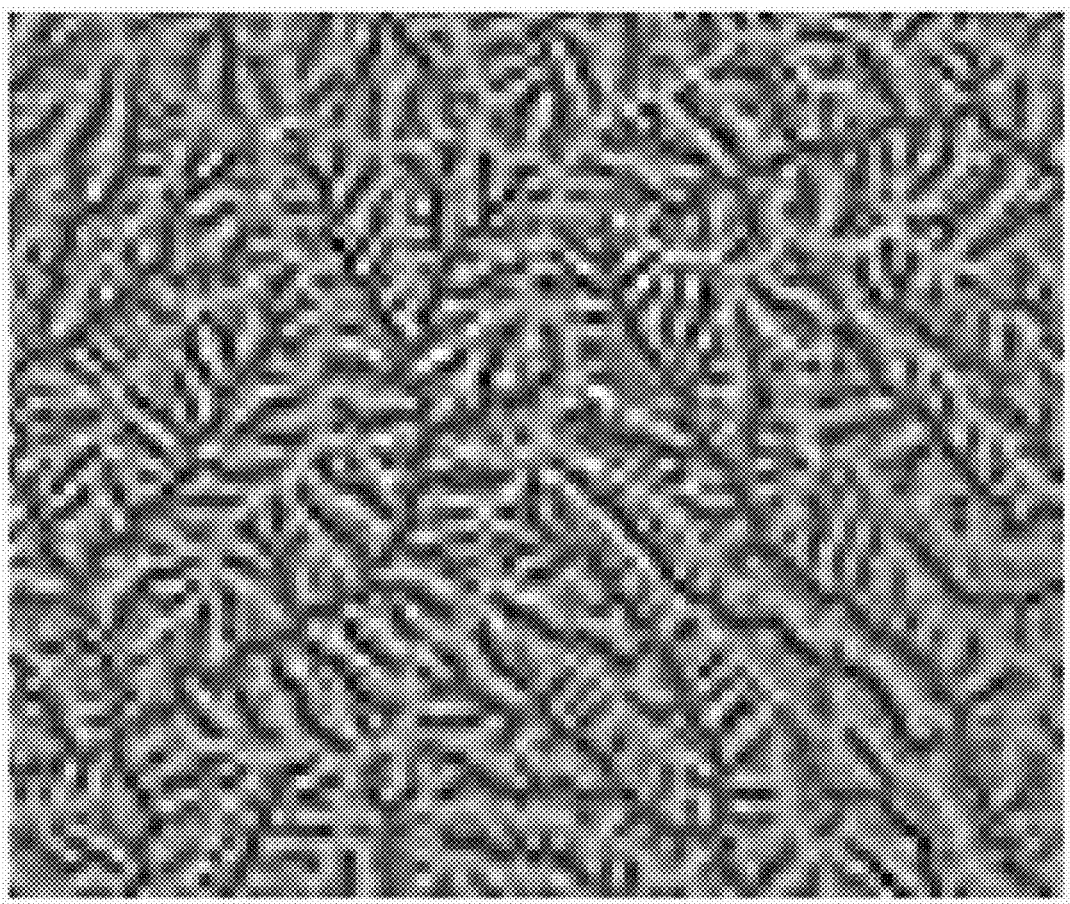
FIG. 5 is an effect diagram of reconstruction after wavelet transform of grid surface curvature according to an embodiment of the present disclosure.

Step 3.3: the low-frequency approximation matrix CA in the Step 3.1 and the three zero matrices ZM1, ZM2 and ZM3 in the Step 3.2 are used for wavelet reconstruction to obtain the reconstruction matrix R, so as to compress the secondary information in the surface curvature C of DEM data and highlight the main information; wavelet reconstruction uses a function in the third-party toolkit of "pywt.waverecn ( )" in the programming language Python to reconstruct according to an input low-frequency approximation matrix CA and three zero matrices ZM1, ZM2 and ZM3. FIG. 5 is an effect diagram of reconstruction after wavelet transform of grid surface curvature.

In this embodiment, in the S4, for the reconstruction matrix R of DEM data after wavelet transformation, the terrain feature points of DEM elevation are extracted based on the feature information γ=30% as the threshold, and specific steps are as follows.

Step 4.1: the reconstruction matrix R of DEM data is statistically analyzed, and the positive values in R are arranged in descending order as a positive value sequence PS, and the negative values are arranged in descending order as a negative value sequence NS; and the statistical analysis operation is carried out by using a function in the third-party toolkit of "numpy.sort ( )" in the programming language Python.

Step 4.2: multiplying the feature information γ by the number of elements in the positive value sequence PS and the negative value sequence NS to obtain the feature number γ PS of the positive value sequence and the feature number γ NS of the negative value sequence; the number of positive and negative value sequence features is calculated by "*" operator in Python.

Step 4.3: respectively taking positive value sequence feature quantity γ PS and negative value sequence feature quantity γ NS as thresholds, extracting the first γ PS elements in positive value sequence PS and the first γ NS elements in negative value sequence NS as feature point sets FS; and the feature point set is calculated by using an index of "list" object and "*" operator in Python.

Figure 6:
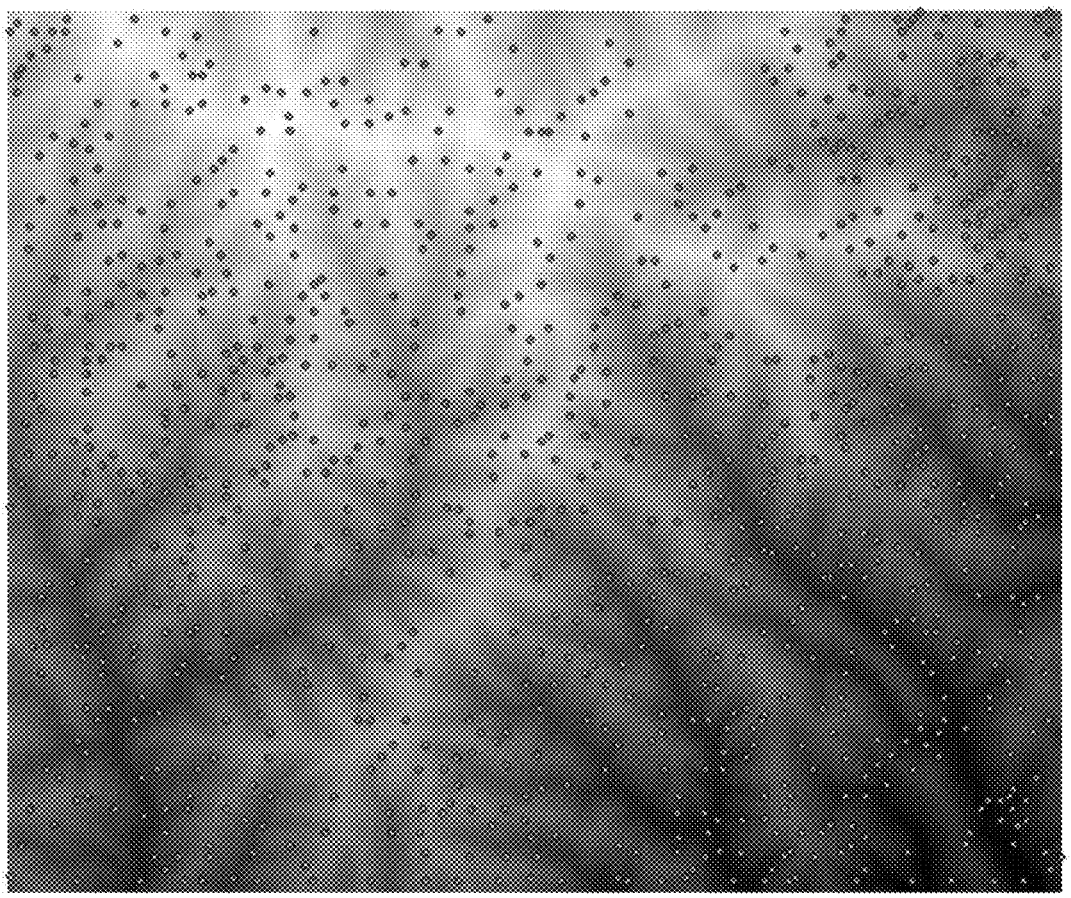
FIG. 6 is a schematic diagram of terrain feature points extracted with feature information of 30% according to an embodiment of the present disclosure.

Step 4.4: traversing the feature point sets FS, mapping the row and column numbers in the wavelet transform reconstruction matrix R to the row and column numbers of DEM data, and marking this position as a terrain feature point as 1 at the same time, after traversing the feature point set FS, marking unlabeled pixels in DEM data as 0 to form a terrain feature point binary image FM; and among them, the terrain feature point matrix is constructed by comparison operators such as "|, >, <" in the programming language Python, and a binary image of terrain feature point is generated by the function in the third-party toolkit of the programming language Python. FIG. 6 is an effect diagram after feature points are selected.

Figure 7:
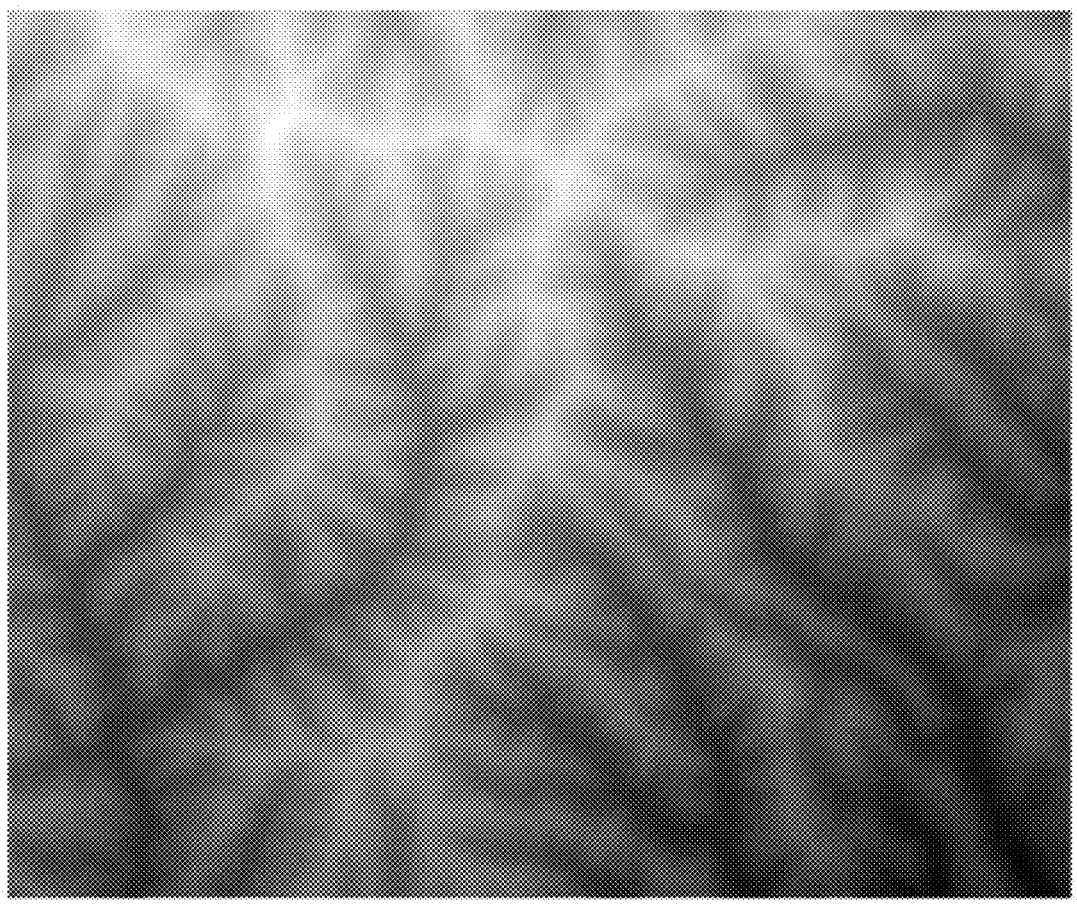
FIG. 7 is a schematic diagram of a result DEM data with an integrated resolution of 50 m according to an embodiment of the present disclosure.

In this embodiment, in the S5, DEM data with resolution P is generated by cubic interpolation of terrain feature points in DEM data and resampling at the same time with p as the resolution, which is recorded as Dφ to realize DEM synthesis. Among them, cubic interpolation is processed by a function in the third-party toolkit of "scipy.interpolate.griddata ( )" in Python, and resampling is calculated by s tool of ArcToolbox\Data Management Tool\Grid\Grid Processing\Resampling in ArcGIS, a GIS software. FIG. 7 shows the resultant DEM data with a resolution of 50 m after integration.

The above is only the preferred embodiment of this disclosure, but the protection scope of this disclosure is not limited to this. Any change or replacement that may be easily thought of by a person familiar with this technical field within the technical scope disclosed in this disclosure should be included in the protection scope of this disclosure. Therefore, the protection scope of this disclosure should be based on the protection scope of the claims.

What is claimed is:

1. A method for multi-scale DEM generation based on curvature wavelet transform, comprising the following steps:

acquiring a wavelet basis function and a wavelet decomposition layer number of the curvature wavelet transform, as well as DEM related parameters, wherein the parameters comprise feature information amount and an output resolution;

acquiring a grid surface curvature of DEM data, and decomposing and reconstructing the grid surface curvature of the DEM data based on the wavelet basis function and wavelet decomposition layer number to obtain a reconstruction matrix;

extracting terrain feature points in the DEM data with the feature information amount as a threshold based on the reconstruction matrix; and resampling with the output resolution as a resolution to realize DEM generation and synthesis based on the terrain feature points in the DEM data;

wherein a process of extracting the terrain feature points in the DEM data comprises: acquiring a positive value sequence and a negative value sequence based on the reconstruction matrix; multiplying the feature information amount by the positive value sequence and negative value sequence respectively to obtain a corresponding positive value sequence feature quantity and a negative value sequence feature quantity; taking the positive value sequence feature quantity and the negative value sequence feature quantity as thresholds respectively, extracting elements in the positive value sequence and the negative value sequence as feature point sets; and traversing all the feature point sets, mapping a row and column number of each feature point in the reconstruction matrix to a row and column number of the DEM data, and marking the terrain feature points, and then obtaining all the terrain feature points in the DEM data after traversing;

wherein an acquisition process of the positive value sequence is: arranging positive values in the reconstruction matrix from large to small to obtain the positive value sequence; and an acquisition process of the negative value sequence is: arranging negative values in the reconstruction matrix from small to large to obtain the negative value sequence.

2. The method for the multi-scale DEM generation based on the curvature wavelet transform according to claim 1, wherein a process of obtaining the grid surface curvature of the DEM data comprises: obtaining an original DEM data, fitting an elevation value of each pixel in the original DEM data and adjacent eight pixels, and obtaining the grid surface curvature of the DEM data.

3. The method for the multi-scale DEM generation based on the curvature wavelet transform according to claim 1, wherein a process of decomposing the grid surface curvature of the DEM data comprises: performing wavelet transform on the grid surface curvature of the DEM data based on the wavelet basis function and the wavelet decomposition layer number to obtain a low-frequency approximation matrix and three high-frequency detail matrices, wherein the high-frequency detail matrices comprise a horizontal detail matrix, a vertical detail matrix and a diagonal detail matrix.

4. The method for the multi-scale DEM generation based on the curvature wavelet transform according to claim 3, wherein a process of reconstructing the grid surface curvature of the DEM data comprises: constructing three zero matrices with same sizes as the high-frequency detail matrices, and performing wavelet reconstruction with the low-frequency approximation matrix and the three zero matrices to obtain the reconstruction matrix.

5. The method for the multi-scale DEM generation based on the curvature wavelet transform according to claim 1, wherein a process of the DEM generation and the synthesis comprises: carrying out cubic interpolation of the terrain feature points in the DEM data, resampling with the output resolution as the resolution at a same time to obtain a new resolution of the DEM data, and realizing the DEM generation and the synthesis.

* * * * *